US011966234B2

(12) United States Patent
Guizilini et al.

(10) Patent No.: US 11,966,234 B2
(45) Date of Patent: Apr. 23, 2024

(54) SYSTEM AND METHOD FOR MONOCULAR DEPTH ESTIMATION FROM SEMANTIC INFORMATION

(71) Applicant: TOYOTA RESEARCH INSTITUTE, INC., Los Altos, CA (US)

(72) Inventors: Vitor Guizilini, Santa Clara, CA (US); Jie Li, Los Altos, CA (US); Rares A. Ambrus, San Francisco, CA (US); Sudeep Pillai, Santa Clara, CA (US); Adrien Gaidon, San Jose, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 462 days.

(21) Appl. No.: 16/937,470

(22) Filed: Jul. 23, 2020

(65) Prior Publication Data

US 2022/0026918 A1 Jan. 27, 2022

(51) Int. Cl.
| | | |
|---|---|---|
| *G06T 17/00* | (2006.01) | |
| *G05D 1/00* | (2006.01) | |
| *G06T 7/11* | (2017.01) | |
| *G06T 7/50* | (2017.01) | |
| *G06T 9/00* | (2006.01) | |
| *G06V 10/82* | (2022.01) | |
| *G06V 20/56* | (2022.01) | |
| *G06V 30/262* | (2022.01) | |

(52) U.S. Cl.
CPC .............. *G05D 1/0251* (2013.01); *G06T 7/11* (2017.01); *G06T 7/50* (2017.01); *G06T 9/00* (2013.01); *G06V 10/82* (2022.01); *G06V 20/56* (2022.01); *G06V 30/274* (2022.01); *G06T 2207/20081* (2013.01); *G06T 2207/30252* (2013.01)

(58) Field of Classification Search
CPC .. G06T 7/10–7/194; G06T 7/50–7/596; G06T 2207/30252; G06T 2207/30261; G05D 1/0251; G05D 1/0246–1/0253; G05D 1/0088; G06V 20/56
See application file for complete search history.

(56) References Cited

U.S. PATENT DOCUMENTS

| | | | |
|---|---|---|---|
| 10,019,657 B2 | 7/2018 | Lin et al. | |
| 10,762,650 B1* | 9/2020 | Guo | ................. G06T 5/001 |
| 2019/0250627 A1* | 8/2019 | Witt | ................. G01C 21/3837 |

OTHER PUBLICATIONS

Atapour-Abarghouei et al., "Monocular Segment-Wise Depth: Monocular Depth Estimation Based on a Semantic Segmentation Prior", 2019, IEEE, ICIP 2019, pp. 4295-4299. (Year: 2019).*
Min Yue et al., "Semi-Supervised Monocular Depth Estimation Based on Semantic Supervision", Journal of Intelligent & Robotic Systems (2020) 100:455-463, Published: May 30, 2020 online by Springer, one bib sheet + pp. 455-463. (Year: 2020).*

(Continued)

*Primary Examiner* — Brian Werner
(74) *Attorney, Agent, or Firm* — SEYFARTH SHAW LLP (57) ABSTRACT

A method for controlling an ego agent includes capturing a two-dimensional (2D) image of an environment adjacent to the ego agent. The method also includes generating a semantically segmented image of the environment based on the 2D image. The method further includes generating a depth map of the environment based on the semantically segmented image. The method additionally includes generating a three-dimensional (3D) estimate of the environment based on the depth map. The method also includes controlling an action of the ego agent based on the identified location.

17 Claims, 9 Drawing Sheets

(56) References Cited

OTHER PUBLICATIONS

Arun CS Kumar et al, "DepthNet: A Recurrent Neural Network Architecture for Monocular Depth Prediction", 2018 IEEE/CVF Conference on Computer Vision and Pattern Recognition Workshops, 2018, pp. 396-404. (Year: 2018).*

Liu, et al., "Single Image Depth Estimation From Predicted Semantic Labels," 2010 IEEE Computer Society Conference on Computer Vision and Pattern Recognition, San Francisco, CA, 2010, pp. 1253-1260.

Nekrasov et al., "Fast Neural Search of Compact Semantic Segmentation Models via Auxiliary Cells," found at https://arxiv.org/abs/1810.10804, last revised May 17, 2019.

Wang, et al., "Towards Unified Depth and Semantic Prediction from a Single Image," 2015 IEEE Conference on Computer Vision and Pattern Recognition (CVPR), Boston, MA, 2015, pp. 2800-2809.

Mousavian, et al., "Joint Semantic Segmentation and Depth Estimation with Deep Convolutional Networks," found at https://arxiv.org/abs/1604.07480, and last revised Sep. 19, 2016.

Ochs, et al., "SDNet: Semantically Guided Depth Estimation Network," found at https://arxiv.org/abs/1907.10659, and submitted Jul. 24, 2019.

Liebel, et al., "MultiDepth: Single-Image Depth Estimation via Multi-Task Regression and Classification," found at https://arxiv.org/abs/1907.11111, and submitted Jul. 25, 2019.

Liu, et al., "Discriminative Training of Deep Fully-connected Continuous CRFs with Task-specific Loss," IEEE Transactions on Image Processing, vol. 26, No. 5, pp. 2127-2136, May 2017.

* cited by examiner

SYSTEM AND METHOD FOR MONOCULAR DEPTH ESTIMATION FROM SEMANTIC INFORMATION

BACKGROUND

Field

Certain aspects of the present disclosure generally relate to depth estimation systems.

Background

Agents (for example, vehicles and robots) rely on depth estimates for performing various tasks, such as constructing a three-dimensional (3D) representation of a surrounding environment or identifying 3D objects. The 3D representation may be used for localization and/or autonomous navigation. Improving an accuracy of depth estimates may improve an accuracy of downstream tasks, such as generating 3D representations or 3D object detection. It is desirable to improve the accuracy of depth estimates obtained from images captured by a sensor of the autonomous agent.

SUMMARY

In one aspect of the present disclosure, a method for controlling an ego agent is disclosed. The method includes capturing a two-dimensional (2D) image of an environment adjacent to the ego agent. The method also includes generating a semantically segmented image of the environment based on the 2D image. The method further includes generating a depth map of the environment based on the semantically segmented image. The method still further includes generating a three-dimensional (3D) estimate of the environment based on the depth map. The method also includes controlling an action of the ego agent based on the identified location.

In another aspect of the present disclosure, a non-transitory computer-readable medium with non-transitory program code recorded thereon is disclosed. The program code is for controlling an ego agent. The program code is executed by a processor and includes program code to capture a 2D image of an environment adjacent to the ego agent. The program code also includes program code to generate a semantically segmented image of the environment based on the 2D image. The program code further includes program code to generate a depth map of the environment based on the semantically segmented image. The program code still further includes program code to generate a 3D estimate of the environment based on the depth map. The program code also includes program code to control an action of the ego agent based on the identified location.

Another aspect of the present disclosure is directed to an apparatus. The apparatus having a memory, one or more processors coupled to the memory, and instructions stored in the memory. The instructions being operable, when executed by the processor, to cause the apparatus to capture a 2D image of an environment adjacent to the ego agent. The instructions also cause the apparatus to generate a semantically segmented image of the environment based on the 2D image. The instructions additionally cause the apparatus to generate a depth map of the environment based on the semantically segmented image. The instructions further cause the apparatus to generate a 3D estimate of the environment based on the depth map. The instructions still cause the apparatus to control an action of the ego agent based on the identified location.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may perform various tasks based on depth estimates. The collection of depth estimates may be referred to as a depth map. For example, the agent may generate a 3D representation of a scene based on a depth map of an image obtained from a sensor. The 3D representation is also referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation. Additionally, or alternatively, the agent may identify 3D objects based on the depth estimates during autonomous operation.

As another example, an agent may implement a scene understanding model (e.g., a trained artificial neural network) to identify objects and/or areas of interest in an image. The scene understanding model may use a depth map generated from sensor data. In such examples, the artificial neural network may be a convolutional neural network trained to identify and track objects captured by one or more sensors (e.g., LIDAR sensors, sonar sensors, RGB cameras, RGB-depth (RGB-D) cameras, and the like). The sensors may be coupled to, or in communication with, a device, such as the agent. Object detection applications of an agent may analyze sensor image data to detect objects (e.g., pedestrians, cyclists, other cars, etc.) in the surrounding scene from the agent.

As described, an agent may plan/estimate ego-motion through the environment by perceiving distances via depth estimates of sensor data. Conventional systems may generate depth estimates from one or more images captured by one or more sensors of the agent. In most cases, the images are red-green-blue (RGB) images.

In some cases, an image may be semantically segmented. Semantic segmentation refers to a process of linking each pixel in the image to a class label. Multiple class labels may be specified, where each class label corresponds to a different object class. For example, a first class label may label pedestrians (e.g., people), a second class label may label vehicles, and a third class label may label buildings. For ease of explanation, a semantically segmented image may be referred to as a semantic image.

Each pixel of an RGB image may include a value from zero to 255, where the value may represent a color of the pixel. In contrast, a pixel in a semantic image may have a value of 0 to N, where N is a number of designated classes. For example, a neural network is trained to identify twenty classes, such as cars, pedestrians, roads, buildings, etc. In this example, a value of a pixel in the semantic image is between zero and twenty. As such, a semantic image may be less complex in comparison to an RGB image.

As described, semantic images contain class information and do not include appearance-based information or texture information. Therefore, a memory footprint of a semantic image may be less than a memory footprint of an RGB image. Additionally, a compression rate for semantic images may be greater than a compression rate for RGB images. That is, semantic images may be compressed to a smaller memory size in comparison to RGB images. Thus, semantic images may reduce bandwidth and overhead for a communication network and/or hardware specified for processing depth estimates.

Aspects of the present disclosure are directed to improving depth estimation systems by estimating depth from semantic images. In one configuration, the semantic images are monocular semantic images.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 1:
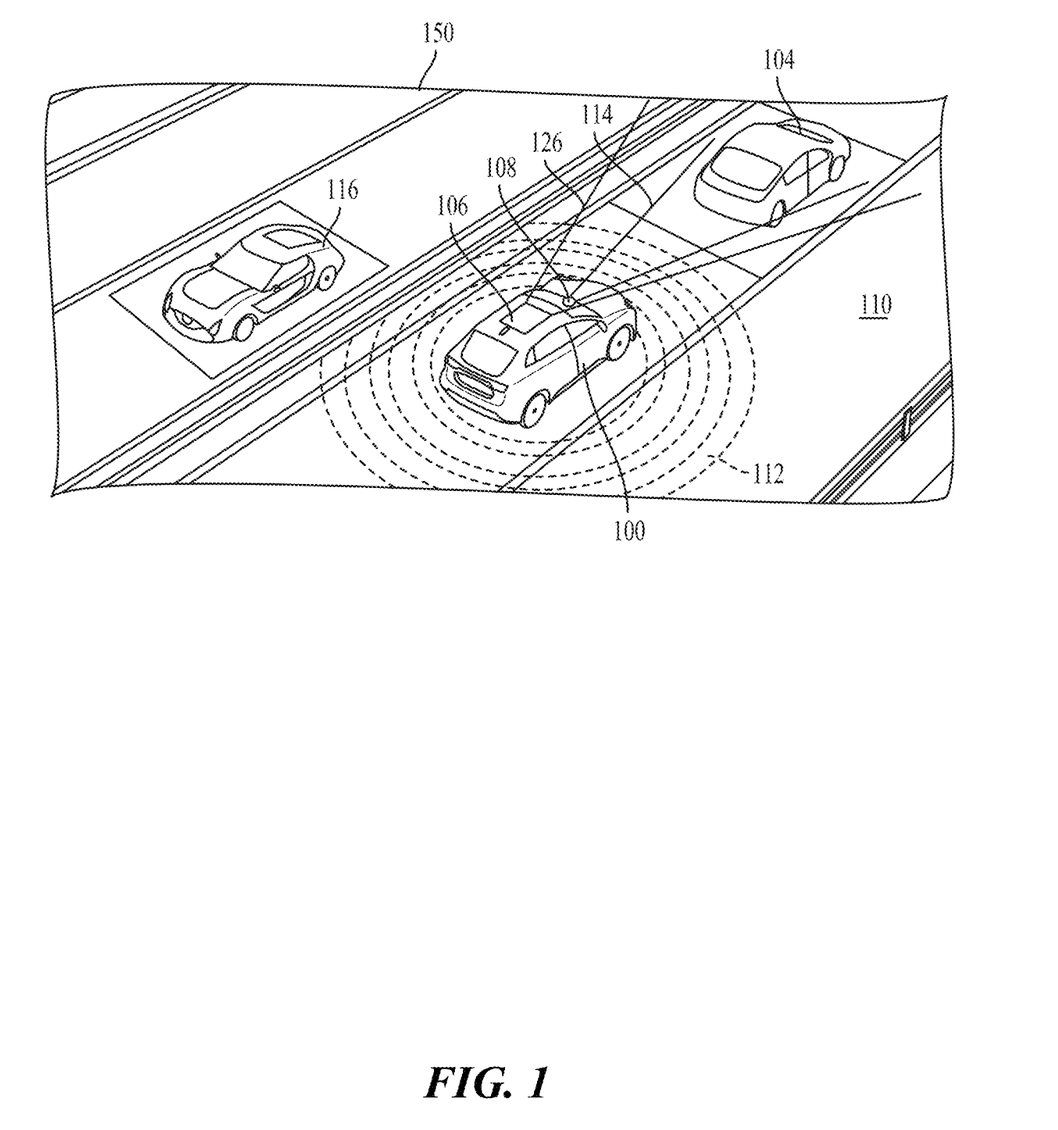
FIG. 1 illustrates an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR, light detection and ranging (LIDAR), and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

As described with reference to FIG. 1, an agent, such as the ego vehicle 100, may use sensors (e.g., an RGB camera or LIDAR sensors) to build 3D representations of a local environment. LIDAR sensors may provide reliable and accurate range data at large distances. A LIDAR sensor may be used for a variety of applications, such as mapping, localization, object detection, and collision avoidance.

Nevertheless, due to their cost, LIDAR sensors are not economically viable. Additionally, a LIDAR sensor's 3D reconstruction may be sparse. Cameras, such as RGB cameras, may provide dense scene information and a spatial understanding of the scene by reasoning across space and time. Additionally, cameras may be more economically viable in comparison to LIDAR sensors.

Still, as described, RGB images may be complex. Therefore, depth estimation systems (e.g., a neural network model for estimating depth) may be further improved by estimating depth from a semantic image instead of an RGB image. The use of semantic images may reduce, at least, a memory footprint, hardware bandwidth, and/or network bandwidth. Additionally, in contrast to RGB images, depth estimates from semantic images may be trained from virtual data as opposed to real data. Therefore, training resources, such as time, are reduced.

In some implementations, a semantic segmentation model (e.g., a semantic segmentation neural network) generates a semantic map from a received image. The architecture of the semantic segmentation model may be an encode-decoder architecture, where a decoder network follows an encoder network. The decoder semantically projects discriminative features learned by the encoder onto a pixel space of an input image to obtain a dense classification.

In one implementation, a semantic segmentation model uses an encoder network for pixel-level discrimination as well as a decoding network for projecting the learned discriminative features onto the pixel space. By contrast, in conventional classifications, the main objective is the end result (e.g., the classification) of the artificial neural network. Different approaches use different decoding networks. Aspects of the present disclosure are not limited to a particular encoder/decoder network architecture for the semantic segmentation model.

Figure 2A:
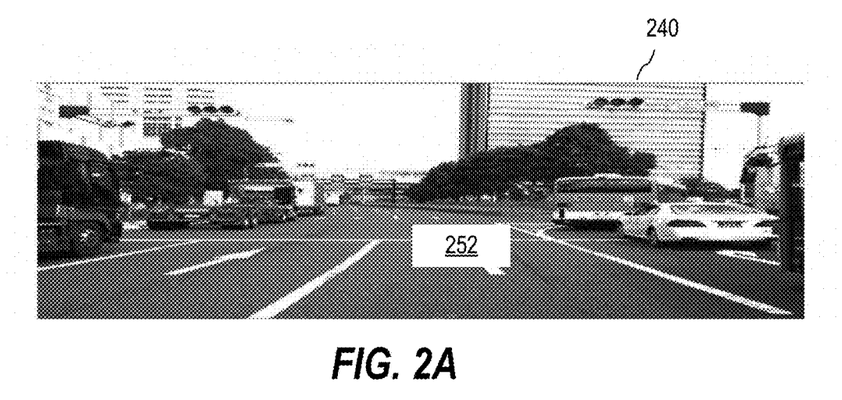
FIG. 2A is an example of an RGB image, in accordance with aspects of the present disclosure.

FIG. 2A illustrates an example of an RGB image 200 of a scene 252 according to aspects of the present disclosure. The RGB image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The RGB image 200 may also be referred to as a current image. The RGB image 200 captures a 2D representation of a scene.

Figure 2B:
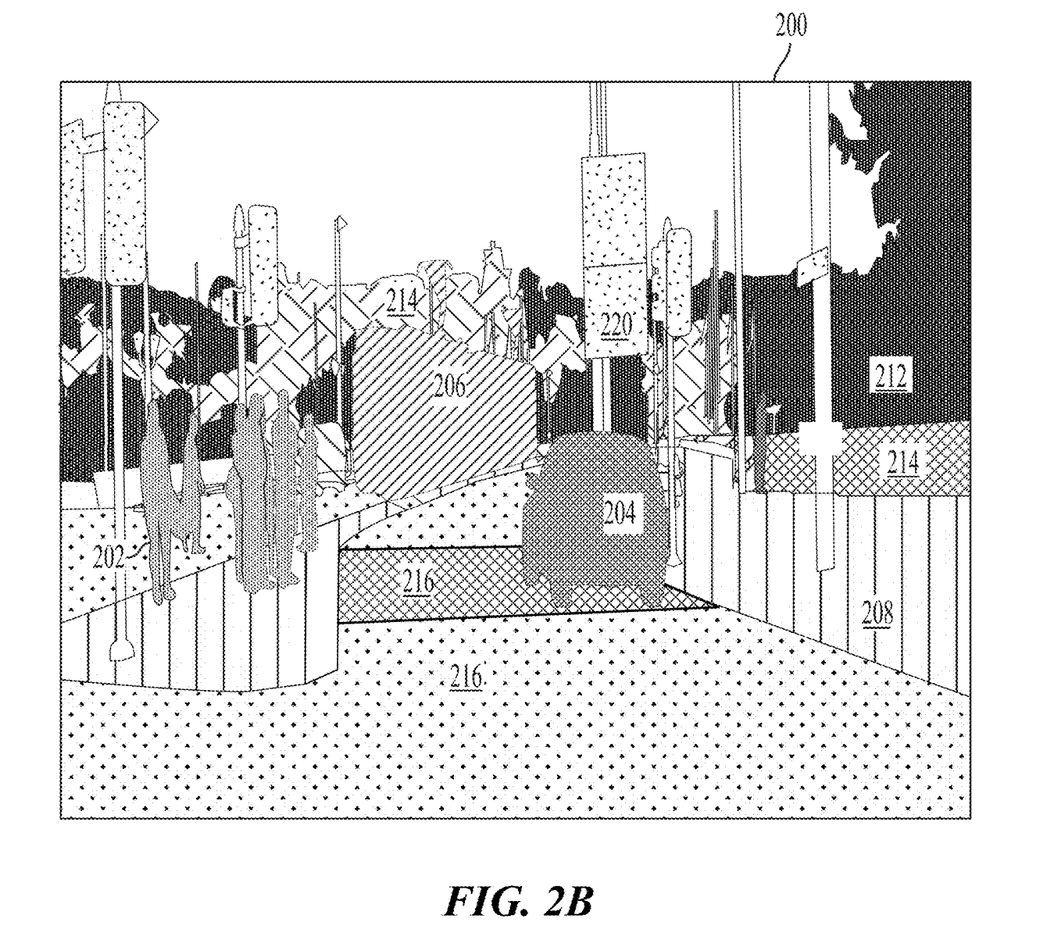
FIG. 2B is an example of a semantic image, in accordance with aspects of the present disclosure.

FIG. 2B illustrates an example of a semantic image 240 according to aspects of the present disclosure. In one configuration, a semantic segmentation model generates the semantic image 240 based on an RGB image, such as the RGB image 200, input to the semantic segmentation model. The RGB image may be a monocular image. The semantic image 240 of FIG. 2B is provided for illustrative purposes. The scene 252 of the RGB image 200, a depth map 250, and a 3D reconstruction 260, as described with reference to FIGS. 2A, 2C, and 2D, differs from the scene of the semantic image 240 as described with reference for FIG. 2B.

As shown in FIG. 2B, each pixel of the semantic image 240 may be associated with a semantic label selected from a number of semantic labels. The semantic labels may be assigned via a neural network, such as a convolution neural network, trained for semantic segmentation. In the example of FIG. 2B, each pixel may be associated with one of a pedestrian label 202, a car label 204, a train label 206, a sidewalk label 208, a street sign label 210, a vegetation label 212, a building label 214 (e.g., structures), a street label 218, or a crosswalk label 216. Aspects of the present disclosure are not limited to labeling the discussed elements, other elements, such as poles for holding street signs may be labeled. For simplicity, some labels are omitted. In the example of FIG. 2B, pixels corresponding to a same class label have the same shading.

Figure 2C:
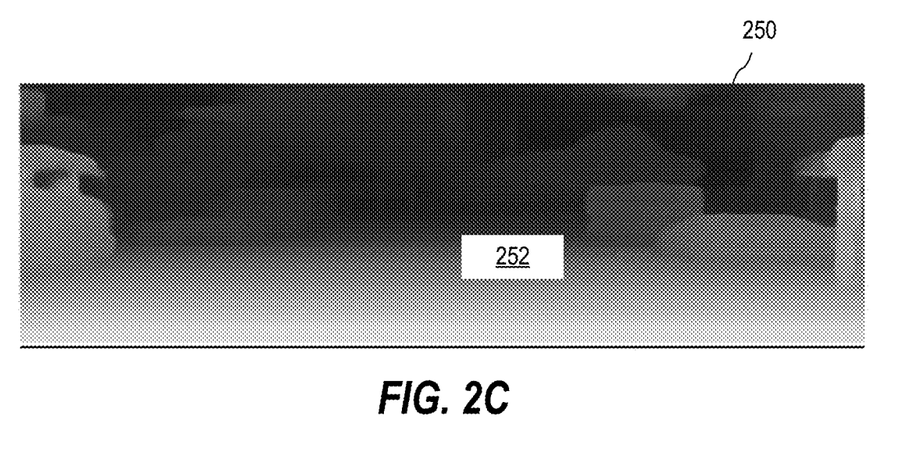
FIG. 2C is an example of a depth map, in accordance with aspects of the present disclosure.

FIG. 2C illustrates an example of a depth map 250 of the scene 252 according to aspects of the present disclosure. The depth map 250 may be estimated from a semantic image, such as the semantic image 240. The depth map 220 provides a depth of a scene. The depth may be represented as a color or other feature.

FIG. 2D illustrates an example of a 3D reconstruction 260 of the scene 252 according to aspects of the present disclosure. The 3D reconstruction may be generated from the depth map 250 as well as a pose of the RGB image 200 (e.g., a target image) and a source image. As shown in FIGS. 2A and 2D, the viewing angle of the scene 252 in the 3D reconstruction 260, is different from the viewing angle of the scene 252 in the RGB image 200. Because the 3D reconstruction 260 is a 3D view of the scene 252, the viewing angle may be changed as desired. The 3D reconstruction 260 may be used to control one or more actions of the agent.

Conventional convolutional architectures use striding and pooling to increase field sizes. The striding and pooling may decrease model performance for tasks requiring fine-grained representations. Additionally, conventional upsampling processes fail to propagate and preserve sufficient details at the decoder layers, thereby reducing the accuracy of depth predictions.

In contrast to conventional convolutional architectures, aspects of the present disclosure implement a depth model with an encoder-decoder architecture that includes 3D packing and unpacking blocks. In one configuration, the packing and unpacking blocks downsample and upsample feature maps during the encoding and decoding stages. Additionally, the packing and unpacking blocks learn to jointly preserve and recover spatial information for depth estimation.

In one configuration, a packing block folds the spatial dimensions of convolutional feature maps into additional feature channels. That is, the feature space is concatenated. The resulting tensor is at a reduced resolution. In contrast to striding or pooling, the spatial dimension transformation is invertible and comes at no loss. Next, the concatenated feature space is compressed to reduce its dimensionality to a desired number of output channels. Specifically, the concatenated feature space is expanded via a 3D convolutional layer. The resulting higher dimensional feature space is then flattened via reshaping before applying the final 2D convolutional contraction.

The unpacking block may decompress and unfold packed convolutional feature channels back to higher resolution spatial dimensions during the decoding process. The unpacking block replaces convolutional feature upsampling, typically performed via nearest-neighbor or with learnable transposed convolutional weights. The unpacking process reverses the 3D packing process performed by the encoder.

During the unpacking process, a 2D convolutional layer produces the required number of feature channels for a subsequent 3D convolutional layer. The 3D convolution expands the compressed spatial features. The unpacked features are then converted back to spatial details via a reshape operation to obtain a tensor with the desired number of output channels and target higher resolution.

Figure 3:
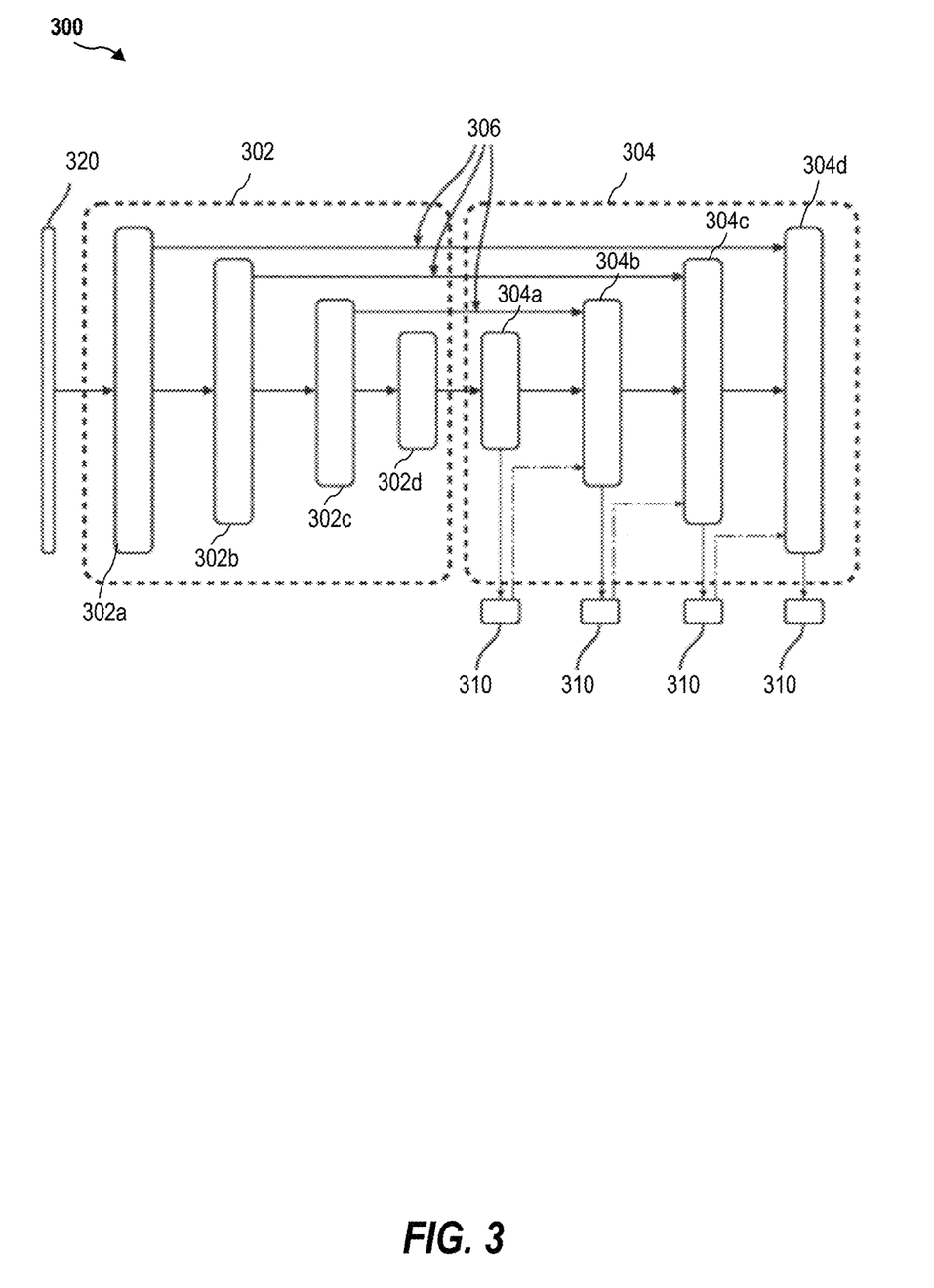
FIG. 3 is a block diagram illustrating an example of a depth network according to aspects of the present disclosure.

FIG. 3 illustrates an example of a depth network 300 according to aspects of the present disclosure. As shown in FIG. 3, the depth network 300 includes an encoder 302 and a decoder 304. The depth network 300 generates a per-pixel depth map, such as the depth map 220 of FIG. 2C, of an input image 320. According to aspects of the present disclosure, the input image 320 may be a semantic image, such as the semantic image 240 described with reference to FIG. 2B.

The encoder 302 includes multiple encoder layers 302a-d. Each encoder layer 302a-d may be a packing layer for downsampling features during the encoding process. The decoder 304 includes multiple decoder layers 304a-d. In FIG. 3, each decoder layer 304a-d may be an unpacking layer for upsampling features during the decoding process. That is, each decoder layer 304a-d may unpack a received feature map.

Skip connections 306 transmit activations and gradients between encoder layers 302a-d and decoder layers 304a-d. The skip connections 306 facilitate resolving higher resolution details. For example, a gradient may be directly back-propagated to layers via the skip connections 306, thereby improving training. Additionally, the skip connections 306 directly transmit image details (e.g., features) from convolutional layers to deconvolutional layers, thereby improving image recovery at higher resolutions.

The decoder layers 304a-d may generate intermediate inverse depth maps 310. Each of the intermediate inverse depth maps 310 may be upsampled before being concatenated with a corresponding one of the skip connections 306 and feature maps unpacked by a corresponding decoder layer 304a-d. The intermediate inverse depth maps 310 also serve as the output of the depth network from which the loss is calculated. In contrast to conventional systems that incrementally super-resolve each of the intermediate inverse depth maps 310. Aspects of the present disclosure upsample each of the intermediate inverse depth maps 310 to a highest resolution using bilinear interpolation. Upsampling to the highest resolution reduces copy-based artifacts and photometric ambiguity, thus improving depth estimates.

As described, 3D reconstruction, such as the 3D reconstruction 260 described with reference to FIG. 2D, may be generated from a depth map, such as the depth map 220 as described with reference to FIG. 2C. The depth map may be generated from a semantic image, such as the semantic image 240 described with reference to FIG. 2C. The 3D reconstruction may be generated by a trained 3D reconstruction model including a depth estimation network, a pose network, and a view estimation module. According to aspects of the present disclosure, the 3D reconstruction model also includes a semantic segmentation model.

Figure 4:
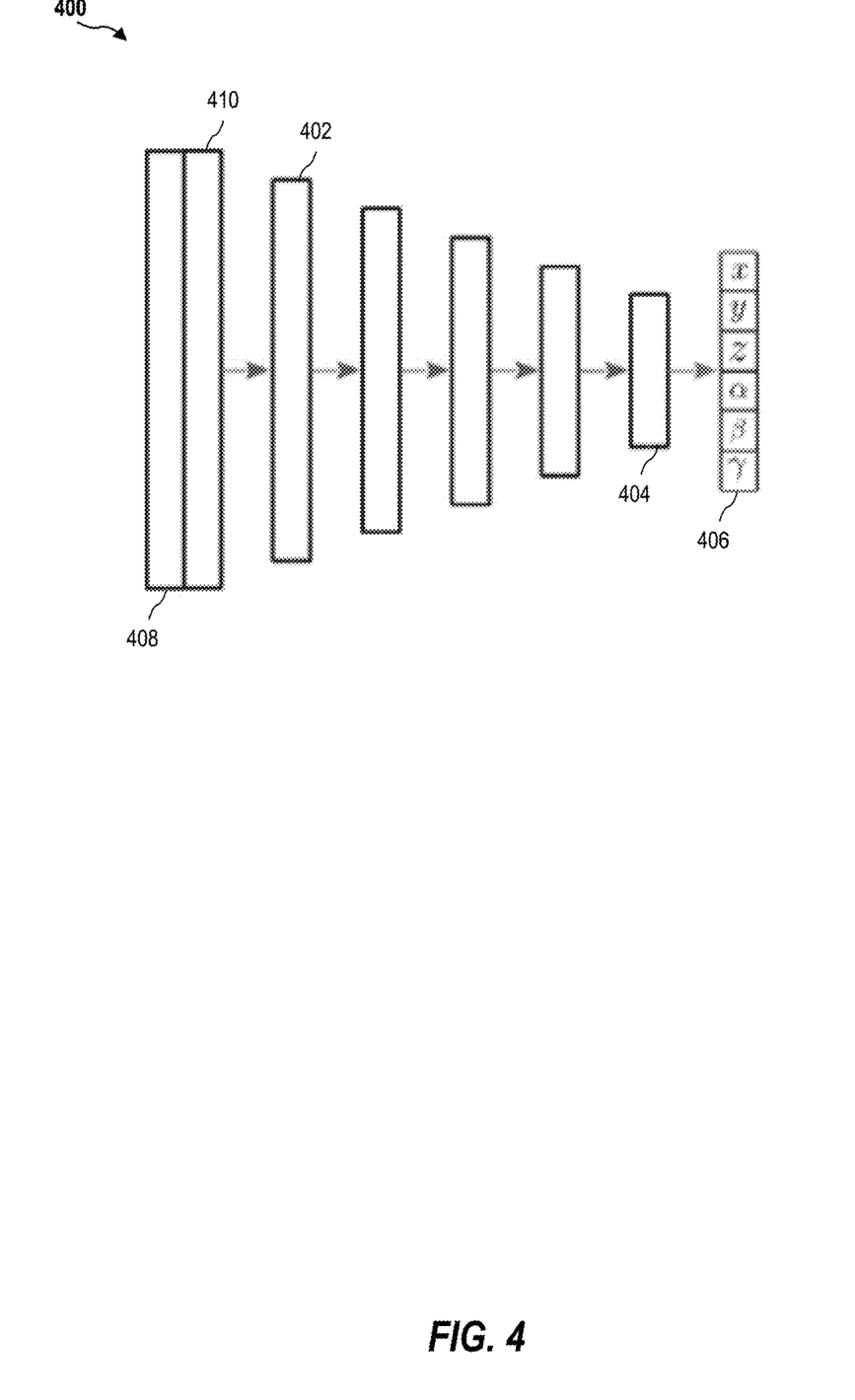
FIG. 4 is a block diagram illustrating an example of a pose network according to aspects of the present disclosure.

FIG. 4 illustrates an example of a pose network 400 for ego-motion estimation according to aspects of the present disclosure. In contrast to conventional pose networks, the pose network 400 of FIG. 4 does not use explainability masks.

As shown in FIG. 4, the pose network 400 includes multiple convolutional layers 402, a final convolutional layer 404, and a multi-channel (e.g., six-channel) average pooling layer 406. The final convolutional layer 404 may be a 1×1 layer. The multi-channel average pooling layer 406 may be a six-channel layer.

In one configuration, a target image ($I_t$) 408 and a source image ($I_s$) 410 are input to the pose network 400. The target image 408 and the source image 410 may be concatenated when input to the pose network 400. During training, the source image 410 may be used during different training epochs. The source image 410 may include an image at a previous time step (t−1) and an image at a subsequent time step (t+1). The output is a set of six DoF transformations between the target image 408 and the source image 410. The process may be repeated for each source image 410 if more than the source image 410 is considered.

Figure 5:
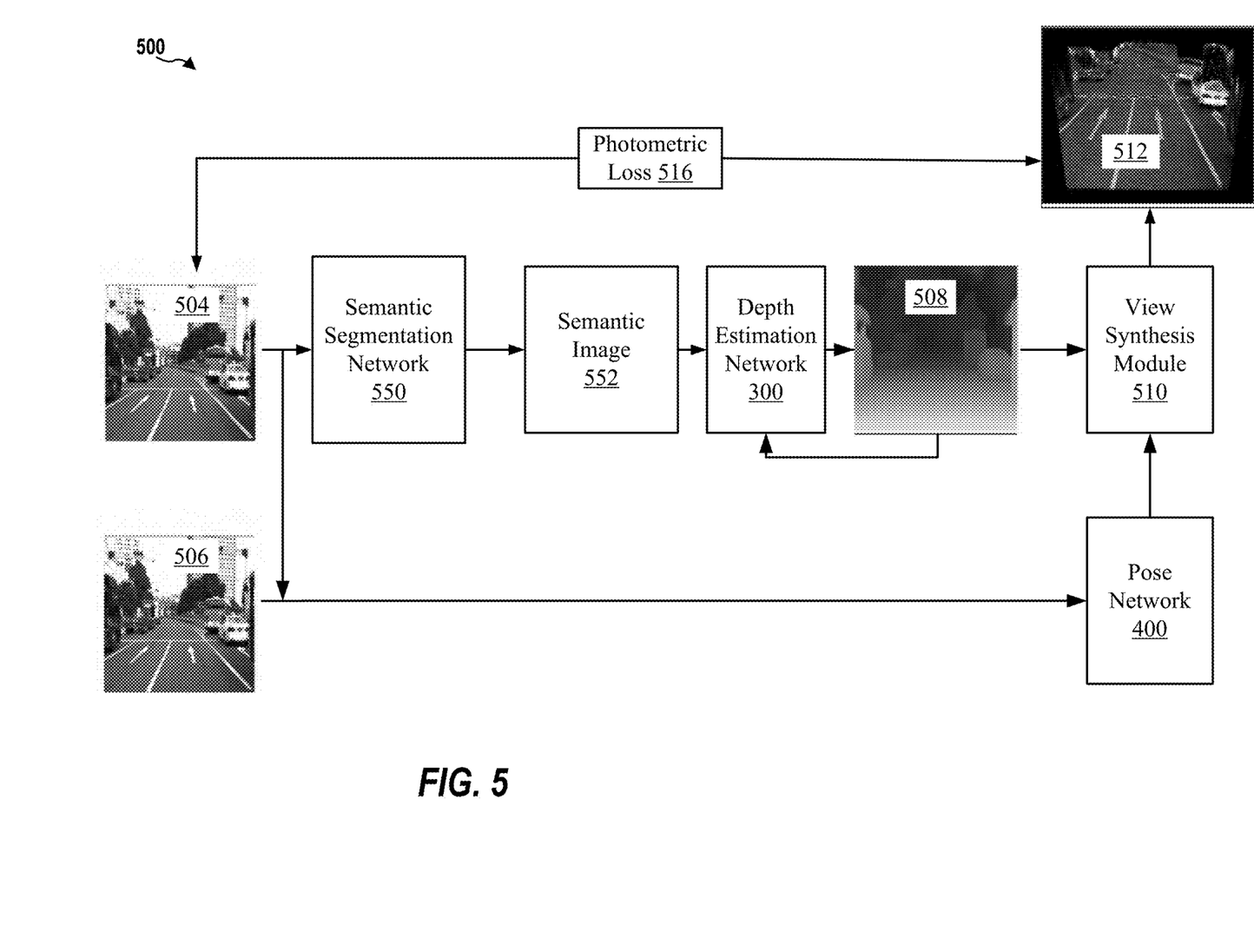
FIG. 5 is a block diagram illustrating an example of a training pipeline according to aspects of the present disclosure.

FIG. 5 illustrates an example of a training pipeline 500 according to aspects of the present disclosure. As shown in FIG. 5, the training pipeline 500 trains the depth network 300 from FIG. 3, the pose network 400 from FIG. 4, and/or a semantic segmentation network 550. The depth network 300 receives a semantic image 552. The pose network 400 may receive a target image 504 ($I_t$) and a source image 506. The source image 506 is referred to as a context image. The target image 504 and the source image 506 may be RGB images.

As shown in FIG. 5, the semantic segmentation network 550 generates the semantic image 552. The depth network 300 generates a depth map 508 of the semantic image 552. The depth map 508 may be a per-pixel depth map.

A view estimation module 510 receives the output of the depth network 300 and the six degrees of freedom (DoF) transformation (e.g., relative pose) output of the pose network 400. As discussed, the six DoF transformation determined by the pose network 400 is a transformation between the target image 504 and the source image 506. The view estimation module 510 warps the source image 506 to reconstruct the target image 504. The reconstructed target image may be referred to as the warped image 512.

That is, the warped image 512 ($I_t$) is generated by sampling pixels from the target image 504 based on the predicted depth map 508 and the transformations (e.g., global transformation and local transformation). For example, each point (e.g., pixel) in the target image 504 is projected onto the source image 506 based on the predicted depth map 508. Bilinear interpolation may approximate a value of the target pixel based on pixels neighboring the target image pixel projected onto the source image 506. The approximated value may be used as the value of the pixel in the warped image 512. In some examples, the bilinear sampling mechanism linearly interpolates values of multiple pixel neighbors (such as, top-left, top-right, bottom-left, and bottom-right) of the target pixel projected onto the source the source image 506. That is, the color of the pixel in the warped image 512 may be based on neighboring pixels in the source image 506. The warped image 512 may be a 3D reconstruction of a 2D target image.

A photometric loss is calculated based on the difference between the target image and the warped image. As shown in FIG. 5, the training pipeline 500 determines a photometric loss 516 based on a comparison of the warped image 512 and the target image 504. The photometric loss 516 may be used to update the depth network 300, the view estimation module 510, the pose network 400, and/or the semantic segmentation network 550.

The photometric loss 516 ($L_p$) may be determined as follows:

$$L_p(I_t, \hat{I}_t) = \alpha \frac{1 - SSIM(I_t, \hat{I}_t)}{2} + (1-\alpha)\|I_t - \hat{I}_t\|, \quad (1)$$

where SSIM( ) is a function for estimating a structural similarity (SSIM) between the target image 504 and the warped image 512. SSIM may be determined as follows:

$$SSIM(x,y) = [l(x,y)]^\alpha \cdot [c(x,y)]^\beta \cdot [s(x,y)]^\gamma, \quad (2)$$

where s( ) determines a structure similarity, c( ) determines a contrast similarity, and l( ) determines a luminance similarity. $\alpha$, $\beta$, and $\gamma$ are parameters for adjusting a relative importance of each component, and each parameter is greater than zero.

The training pipeline 500 may train the depth network 300 to estimate depth from the semantic image 552. Additionally, the training pipeline 500 may generate a warped image 512, as described above, during a testing stage. In the testing stage (for example, real-world deployment) the photometric loss 516 may not be calculated. The warped image 512 may be used for localization and/or other vehicle navigation tasks. Still, in the testing stage, the depth network 300 generated the depth map 508 from the semantic image 552 (e.g., semantically segmented image).

In conventional systems, when training a depth network, such as the depth network 300 as described with reference to FIGS. 3 and 5, the depth network is trained on real images. That is, the RGB images used to train the depth network are real world images. An accuracy of a depth map may be reduced if the RGB images are simulated.

Additionally, objects in RGB images change based on environmental conditions and/or other conditions. For example, lighting, weather conditions, sensor angles, time, and/or other conditions may affect how an object is portrayed in an RGB image. Therefore, when estimating depth from RGB images, the depth network is trained to be more robust to different conditions of the RGB images. In conventional systems, it may be difficult to obtain RGB images portraying objects in different conditions.

In contrast, during training, such as the training pipeline 500 as described with reference to FIG. 5, the semantic images may be generated from virtual images. That is, because the semantic image is composed of labeled pixels, an accuracy of the semantic image is not reduced when a virtual image is used instead of a real image. Therefore, an increased number of training samples may be available to generate semantic images. For example, training samples may be generated from software. Accordingly, the semantic segmentation network used for training may be decoupled from the depth network. The trained depth network may be coupled with another semantic segmentation network during testing.

Furthermore, semantic images are not affected by environmental conditions, such as lighting, time, camera angle, etc. Thus, semantic images are robust to environmental conditions and/or other conditions. Likewise, a depth network trained on semantic images may be more robust to environmental conditions and/or other conditions.

Figure 6:
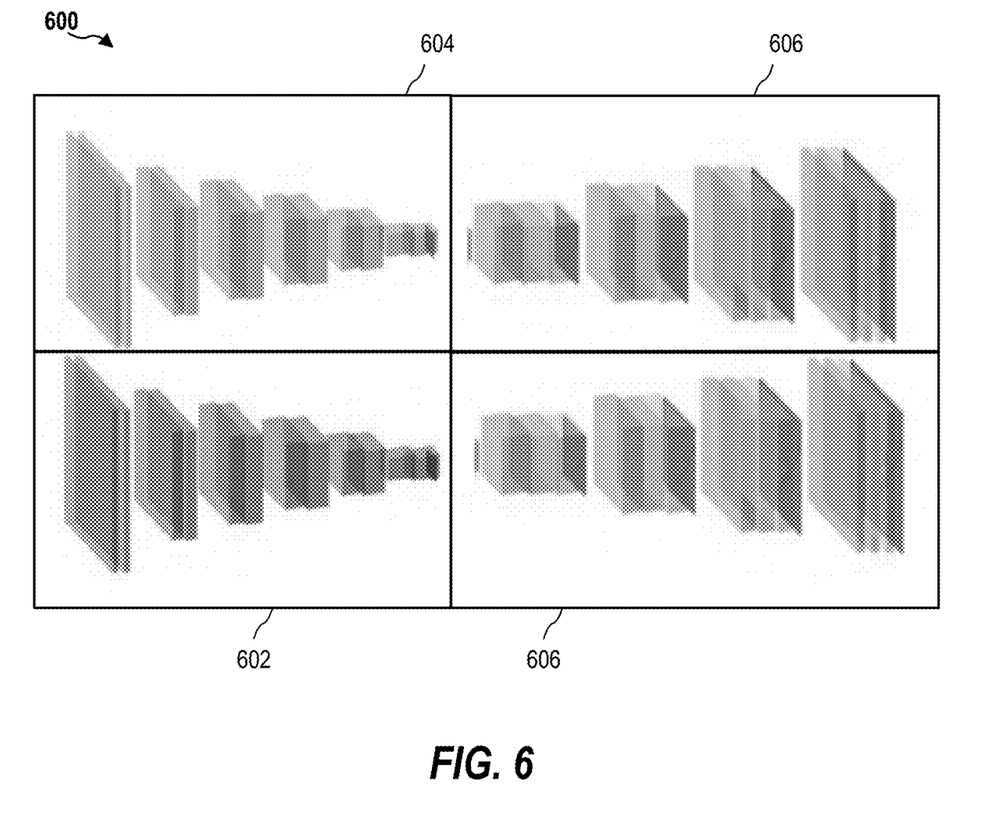
FIG. 6 is a block diagram illustrating an example of a disposable two-stream network according to aspects of the present disclosure.

Aspects of the present disclosure are not limited to the training pipeline 500 as described with reference to FIG. 5, other training processes are contemplated. In one implementation, the depth network may be trained via a disposable two-stream network. FIG. 6 illustrates an example of a disposable two-stream network 600 according to aspects of the present disclosure. In the example of FIG. 6, an RGB encoder 602 is paired with a semantic information encoder 604. The RGB encoder 602 encodes an RGB image (not shown in FIG. 6). The semantic information encoder 604 encodes a semantically segmented image.

Each encoder 602, 604 is paired with a depth decoder 606. Each decoder 606 projects discriminative features learned by a corresponding encoder 602, 604 onto a pixel space of an input image to obtain a dense classification.

During training, a loss for both streams is determined with respect to the RGB image. As such, the loss enforces similarity between intermediate feature maps of the RGB encoder 602 and intermediate feature maps of the semantic information encoder 604. In one configuration, both encoders 602, 604 share a same latent feature space. Additionally, a discriminator improves a quality of the reconstruction.

During inference (for example, a testing stage), the RGB encoder 602 is no longer used. That is, the depth maps are generated from the semantic information encoder 604 paired with the depth decoder 606. After training the depth decoder 606 to generate a depth map from a semantic information encoder 604, a semantic information decoder (not shown) may be trained to generate a semantic image from the depth map.

In one implementation, the depth network 300 of FIG. 5 is replaced with the disposable two-stream network 600. In this implementation, the disposable two-stream network 600 receives the semantic image 552 and generates the depth map 508. During an inference stage (e.g., test stage), the RGB encoder 602 is not used. That is, during the inference stage, the disposable two-stream network 600 is limited to the semantic information encoder 604 and the decoder 606.

Figure 7:
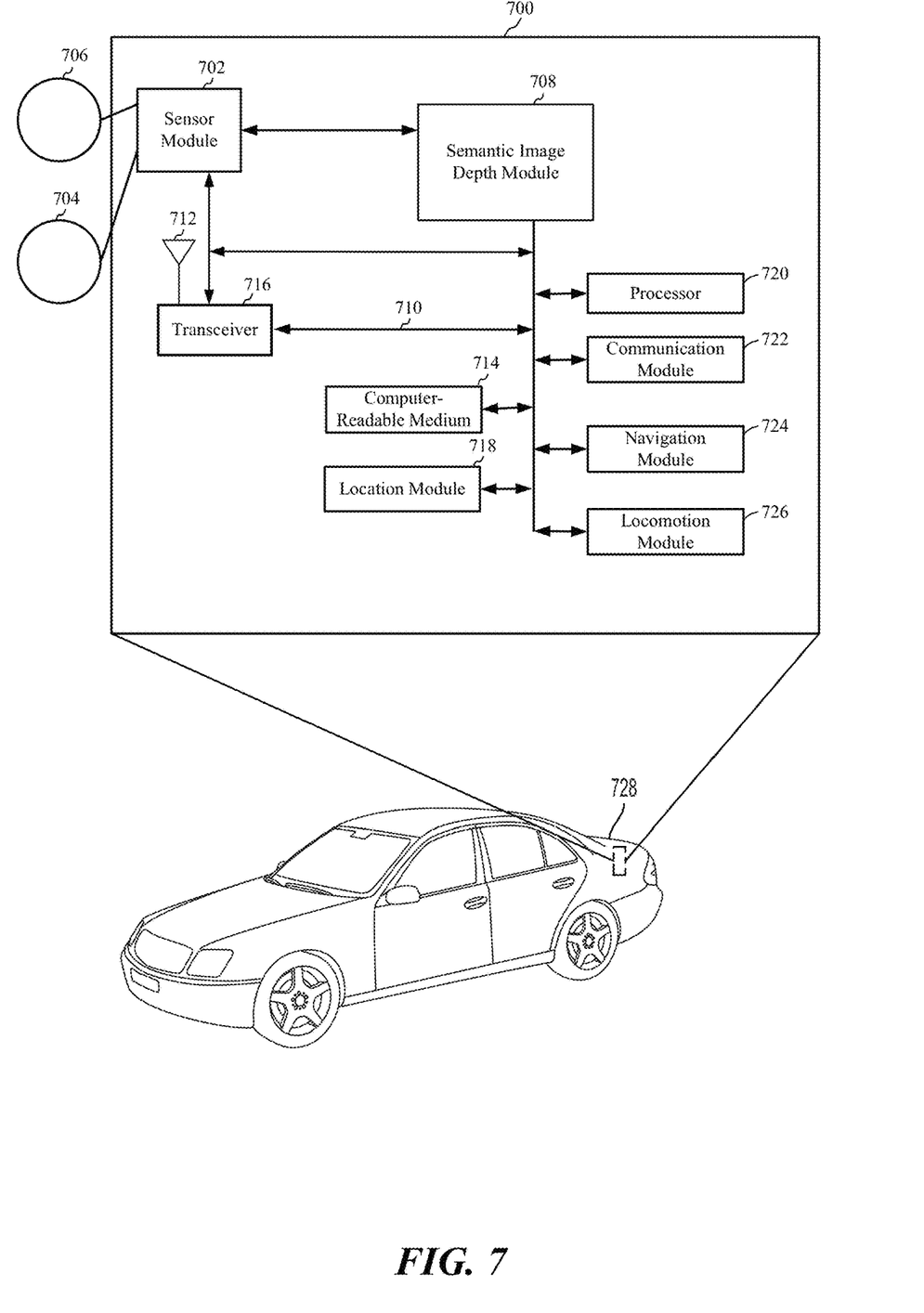
FIG. 7 is a block diagram illustrating an example of a hardware implementation for a depth estimation system according to aspects of the present disclosure.

FIG. 7 is a diagram illustrating an example of a hardware implementation for a depth estimation system 700, according to aspects of the present disclosure. The depth estimation system 700 may be a component of a vehicle, a robotic device, or another device. For example, as shown in FIG. 7, the depth estimation system 700 is a component of a vehicle 728. Aspects of the present disclosure are not limited to the depth estimation system 700 being a component of the vehicle 728, as other types of agents, such as a bus, boat, drone, or robot, are also contemplated for using the depth estimation system 700. The vehicle 728 may be an example of an ego agent, such as a The vehicle 728 may operate in one or more of an autonomous operating mode, a semi-autonomous operating mode, and a manual operating mode. Furthermore, the vehicle 728 may be an electric vehicle, a hybrid vehicle, a fuel vehicle, or another type of vehicle.

The depth estimation system 700 may be implemented with a bus architecture, represented generally by a bus 710. The bus 710 may include any number of interconnecting buses and bridges depending on the specific application of the depth estimation system 700 and the overall design constraints. The bus 710 links together various circuits including one or more processors and/or hardware modules, represented by a processor 720, a communication module 722, a location module 718, a sensor module 702, a locomotion module 726, a navigation module 724, and a computer-readable medium 714. The bus 710 may also link various other circuits such as timing sources, peripherals, voltage regulators, and power management circuits, which are well known in the art, and therefore, will not be described any further.

The depth estimation system 700 includes a transceiver 716 coupled to the processor 720, the sensor module 702, a semantic image depth module 708, the communication module 722, the location module 718, the locomotion module 726, the navigation module 724, and the computer-readable medium 714. The transceiver 716 is coupled to an antenna 712. The transceiver 716 communicates with various other devices over one or more communication networks, such as an infrastructure network, a V2V network, a V2I network, a V2X network, a V2P network, or another type of network. As an example, the transceiver 716 may transmit a warning to other agents when a semantic image depth module 708 determines that an occluded area is occluding high risk information.

The depth estimation system 700 includes the processor 720 coupled to the computer-readable medium 714. The processor 720 performs processing, including the execution of software stored on the computer-readable medium 714 providing functionality according to the disclosure. The software, when executed by the processor 720, causes the depth estimation system 700 to perform the various functions described for a particular device, such as the vehicle 728, or any of the modules 702, 708, 714, 716, 718, 720, 722, 724, 726, 704, 707. The computer-readable medium 714 may also be used for storing data that is manipulated by the processor 720 when executing the software.

The sensor module 702 may obtain measurements via different sensors, such as a first sensor 707 and a second sensor 704. The first sensor 707 may be a vision sensor, such as a stereoscopic camera or a red-green-blue (RGB) camera, for capturing 2D images. The second sensor 704 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 704, 707.

The measurements of the first sensor 707 and the second sensor 704 may be processed by one or more of the processor 720, the sensor module 702, the semantic image depth module 708, the communication module 722, the location module 718, the locomotion module 726, the navigation module 724, in conjunction with the computer-readable medium 714 to implement the functionality described herein. In one configuration, the data captured by the first sensor 707 and the second sensor 704 may be transmitted to an external device via the transceiver 716. The first sensor 707 and the second sensor 704 may be coupled to the vehicle 728 or may be in communication with the vehicle 728.

The location module 718 may determine a location of the vehicle 728. For example, the location module 718 may use a global positioning system (GPS) to determine the location of the vehicle 728. The communication module 722 may facilitate communications via the transceiver 716. For example, the communication module 722 may be configured to provide communication capabilities via different wireless protocols, such as WiFi, long term evolution (LTE), 4G, etc. The communication module 722 may also be used to communicate with other components of the vehicle 728 that are not modules of the depth estimation system 700.

The locomotion module 726 may facilitate locomotion of the vehicle 728. As an example, the locomotion module 726 may control a movement of the wheels. As another example, the locomotion module 726 may be in communication with one or more power sources of the vehicle 728, such as a motor and/or batteries. Of course, aspects of the present disclosure are not limited to providing locomotion via wheels and are contemplated for other types of components for providing locomotion, such as propellers, treads, fins, and/or jet engines.

The depth estimation system 700 also includes the navigation module 724 for planning a route or controlling the locomotion of the vehicle 728, via the locomotion module 726. The navigation module 724 may override user input when the user input is expected (e.g., predicted) to cause a collision. The modules may be software modules running in the processor 720, resident/stored in the computer-readable medium 714, one or more hardware modules coupled to the processor 720, or some combination thereof.

The semantic image depth module 708 may be in communication with and/or work in conjunction with one or more of the sensor module 702, the transceiver 716, the processor 720, the communication module 722, the location module 718, the locomotion module 726, the navigation module 724, and the computer-readable medium 714. For example, the semantic image depth module 708 may be in communication with and/or work in conjunction with one or more of the modules 702, 708, 714, 716, 718, 720, 722, 724, 726, 704, 707 of the depth estimation system 700 to perform the process 800 described in FIG. 8.

Additionally, the semantic image depth module 708 may be in communication with and/or work in conjunction with one or more of the modules 702, 708, 714, 716, 718, 720, 722, 724, 726, 704, 707 of the depth estimation system 700 to capture a two-dimensional (2D) image of an environment adjacent to the ego agent. The semantic image depth module 708 may also be configured to generate a semantically segmented image of the environment based on the 2D image and generate a depth map of the environment based on the semantically segmented image. In one configuration, the semantic image depth module 708 may include the semantic segmentation network 550, the depth estimation network 300, the pose network 400, and/or the view synthesis module 510. The semantic image depth module 708 may further be configured to generate a three-dimensional (3D) estimate of the environment based on the depth map. The semantic image depth module 708 may additionally be configured to control an action of the ego agent based on the identified location.

Figure 8:
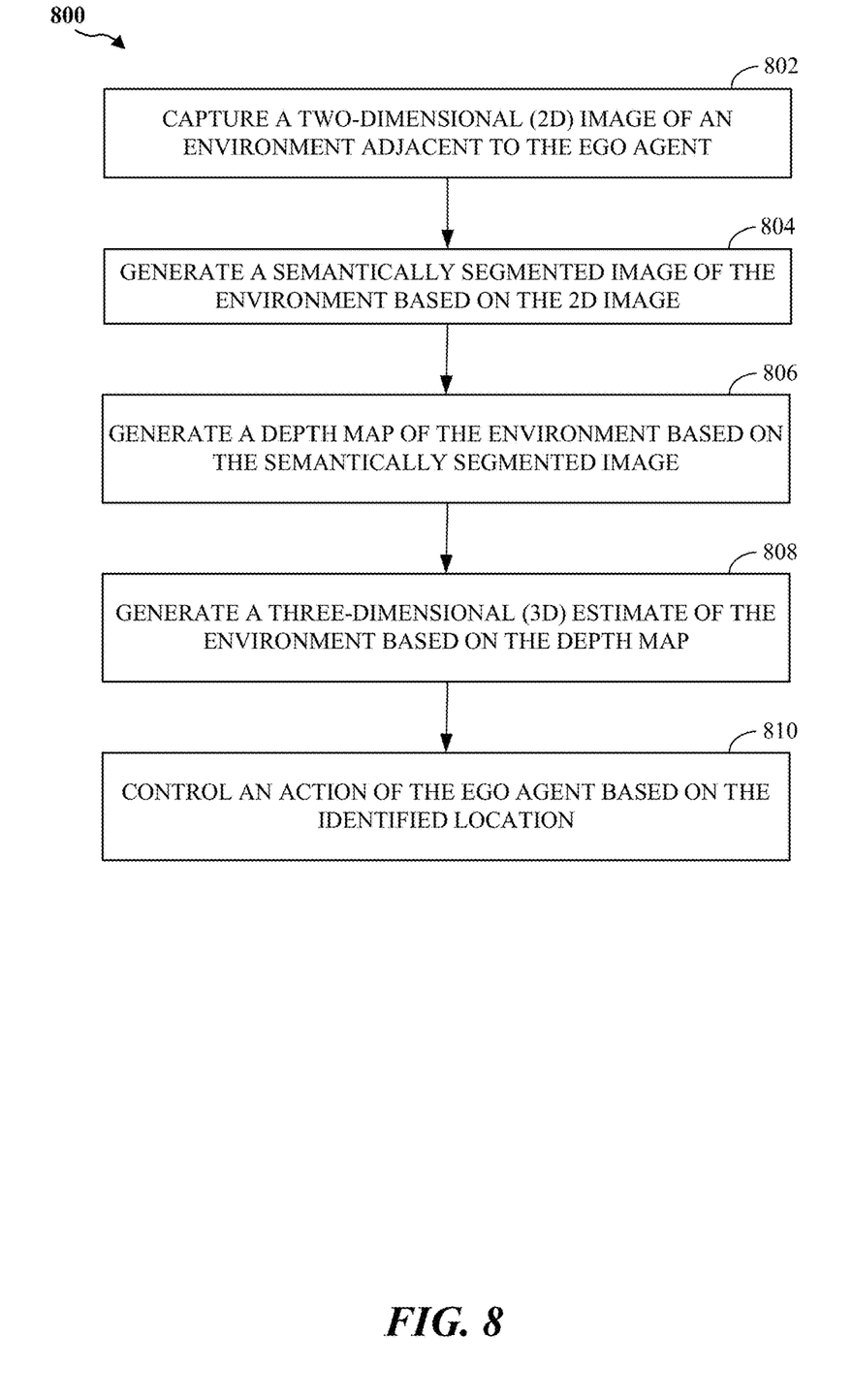
FIG. 8 is a flow diagram for a process according to aspects of the present disclosure.

FIG. 8 illustrates a flow diagram for a process 800 in accordance with aspects of the present disclosure. The process 800 may be performed by an ego agent, such as the ego vehicle 100 as described in FIG. 1 or the vehicle 728 as described in FIG. 7, and/or a semantic image depth module 708 as described in FIG. 7. As shown in FIG. 8, at block 802, the process 800 captures a two-dimensional (2D) image of an environment adjacent to the ego agent. At block 804, the process 800 generates a semantically segmented image of the environment based on the 2D image. In one implementation, the semantically segmented image is generated by a semantic segmentation network, such as the semantic segmentation network 550.

At block 806, the process 800 generate a depth map of the environment based on the semantically segmented image. In one implementation, the depth map is generated by a depth estimation network, such as the depth estimation network 300. At block 808, the process 800 generates a three-dimensional (3D) estimate of the environment based on the depth map. Finally, at block 810, the process 800 controls an action of the ego agent based on the identified location. As an example, the action may include adjusting a planned route and/or planning a new route.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions and data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints.

The bus may link together various circuits including a processor, machine-readable media, and a bus interface. The bus interface may connect to a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling an ego agent comprising:
capturing a first two-dimensional (2D) image associated with a current view of an environment corresponding to a current location of the ego agent;
generating, via a semantic encoder, a semantically segmented image of the first 2D image;
generating, via a depth estimation network, a depth map of the current view of the environment based on the semantically segmented image, the depth estimation network being trained via a disposable two-stream network including a red-green-blue (RGB) encoder, a semantic encoder, and a depth decoder shared between the RGB encoder and the semantic encoder, the depth estimation network being limited to the semantic encoder and the depth decoder during inference;
generating a three-dimensional (3D) reconstruction of the first 2D image based on the depth map and a current pose of the ego agent, the current pose being based on the first 2D image and the second 2D image, the second 2D image associated with a view of the environment that is different from the current view; and
controlling an action of the ego agent based on the 3D estimate of the environment.

2. The method of claim 1, in which, during training:
the RGB encoder encodes a group of RGB training images;
the semantic encoder encodes a group of semantically segmented training images, and
respective images from the group of RGB training images and the group of semantically segmented training images are paired inputs to the disposable two-stream network.

3. The method of claim 2, in which:
the depth decoder generates the depth map; and
the RGB encoder and the semantic encoder share a latent feature space.

4. The method of claim 2, in which one or more semantically segmented training images of the group of semantically segmented training images are virtual images.

5. The method of claim 1, in which the ego agent is an autonomous vehicle.

6. The method of claim 1, further comprising capturing the first 2D image and the second 2D image via a monocular camera integrated with the ego agent.

7. An apparatus for controlling an ego agent, comprising:
a processor;
a memory coupled with the processor; and
instructions stored in the memory and operable, when executed by the processor, to cause the apparatus:
to capture a first two-dimensional (2D) image associated with a current view of an environment corresponding to a current location of the ego agent;
to generate, via a semantic encoder, a semantically segmented image of the first 2D image;
to generate, via a depth estimation network, a depth map of the current view of the environment based on the semantically segmented image, the depth estimation network being trained via a disposable two-stream network including a red-green-blue (RGB) encoder, a semantic encoder, and a depth decoder shared between the RGB encoder and the semantic encoder, the depth estimation network being limited to the semantic encoder and the depth decoder during inference;
to generate a three-dimensional (3D) reconstruction of the first 2D image based on the depth map and a current pose of the ego agent, the current pose being based on the first 2D image and the second 2D image, the second 2D image associated with a view of the environment that is different from the current view; and
to control an action of the ego agent based on the 3D estimate of the environment.

8. The apparatus of claim 7, in which, during training:
the RGB encoder encodes a group of RGB training images;
the semantic encoder encodes a group of semantically segmented training images, and
respective images from the group of RGB training images and the group of semantically segmented training images are paired inputs to the disposable two-stream network.

9. The apparatus of claim 8, in which:
the depth decoder generates the depth map; and
the RGB encoder and the semantic encoder share a latent feature space.

10. The apparatus of claim 8, in which one or more semantically segmented training images of the group of semantically segmented training images are virtual images.

11. The apparatus of claim 7, in which the ego agent is an autonomous vehicle.

12. The apparatus of claim 7, in which the instructions further cause the apparatus to capture the first 2D image and the second 2D image via a monocular camera integrated with the ego agent.

13. A non-transitory computer-readable medium having program code recorded thereon for controlling an ego agent, the program code executed by a processor and comprising:
program code to capture a first two-dimensional (2D) image associated with a current view of an environment corresponding to a current location of the ego agent;
program code to generate, via a semantic encoder, a semantically segmented image of the first 2D image;
program code to generate, via a depth estimation network, a depth map of the current view of the environment based on the semantically segmented image, the depth estimation network being trained via a disposable two-stream network including a red-green-blue (RGB) encoder, a semantic encoder, and a depth decoder shared between the RGB encoder and the semantic encoder, the depth estimation network being limited to the semantic encoder and the depth decoder during inference;
program code to generate a three-dimensional (3D) reconstruction of the first 2D image based on the depth map and a current pose of the ego agent, the current pose being based on the first 2D image and the second 2D image, the second 2D image associated with a view of the environment that is different from the current view; and
program code to control an action of the ego agent based on the 3D estimate of the environment.

14. The non-transitory computer-readable medium of claim 13,
in
which, during training:
the RGB encoder encodes a group of RGB training images;
the semantic encoder encodes a group of semantically segmented training images, and
respective images from the group of RGB training images and the group of semantically segmented training images are paired inputs to the disposable two-stream network.

15. The non-transitory computer-readable medium of claim 14, in which:
the depth decoder generates the depth map; and
the RGB encoder and the semantic encoder share a latent feature space.

16. The non-transitory computer-readable medium of claim 14, in which one or more semantically segmented training images of the group of semantically segmented training images are virtual images.

17. The non-transitory computer-readable medium of claim 13, in which:
the ego agent is an autonomous vehicle; and
the program code further comprises program code to capture the first 2D image and the second 2D image via a monocular camera integrated with the ego agent.

* * * * *